Jan. 17, 1961     H. A. FLOGAUS     2,968,207

BLIND RIVET WHICH PERMITS COLD FLOW OF SHANK MATERIAL

Filed Nov. 25, 1957

INVENTOR.
HOWARD A. FLOGAUS
BY
*Robertson and Gautier*
ATTORNEYS.

United States Patent Office 2,968,207
Patented Jan. 17, 1961

2,968,207

BLIND RIVET WHICH PERMITS COLD FLOW OF SHANK MATERIAL

Howard A. Flogaus, 14 Possum Hollow Road, Wallingford, Pa.

Filed Nov. 25, 1957, Ser. No. 698,731

2 Claims. (Cl. 85—40)

The present invention relates to blind rivets and is concerned primarily with such a rivet of novel construction which provides for the expansion of the shank of the rivet throughout its entire length rather than just at the end.

A blind rivet ordinarily comprises the rivet proper; including a head and a shank integrally extending therefrom, and an insert which is driven in a socket formed in the head and shank and which, when so driven, expands the lower end of the shank. With the rivets now known, the driving-in of the insert causes the shank to elongate and thus that portion of the shank which is coextensive with the plates being joined tends to contract rather than to expand. This is undesirable because such rivets will not properly withstand vibration tests, and further because all of the holding action is at the expanded end. It is to be remembered that the shank of the rivet is split by cross slits at its free end; and as the insert is driven in the portions of the split end are flared outwardly. All of the holding action of the rivet is localized at the point where these outwardly flared parts engage one of the members being riveted.

With the foregoing conditions in mind, the present invention has in view as its foremost objective the provision of a blind rivet of the general character above noted but which is so constructed and arranged as to provide for an expansion of the rivet shank particularly throughout that part which is coextensive with the members being joined.

More in detail, the invention has as an object the provision of a blind rivet including a rivet proper having a head and shank formed with a longitudinally extending recess that is counterbored at the head to provide a shoulder closely adjacent to the head that is engaged by the end of the insert. This arrangement is in contrast to the now-known devices in which the shoulder is located adjacent to the free end of the split shank. As the insert is driven home past this shoulder, the shank is expanded rather than elongated or contracted.

Still another object of the invention is to provide, in a blind rivet of the character aforesaid, a shank that is formed with a plurality of spaced annular grooves on its outer surface. These grooves present edges which are forced into engagement with the surface defining the bore in which the rivet is inserted and further allow room for the metal to flow as the insert is driven home.

Still another object of the invention is to provide, in a blind rivet of the character aforesaid, a shank that is formed with annular grooves on its exterior surface, has a hollow socket extending through its free end, and which is split by cross slits at its free end.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a blind rivet consisting of a rivet proper having a head and a shank integrally joined thereto, with the shank being formed with a longitudinally extending recess that is enlarged to provide a counterbore in the head, a shoulder adjacent thereto, with the free end of the shank being split by cross slits and the exterior surface thereof formed with spaced annular grooves, together with an insert that is normally received in the counterbore in the head and which has a rounded nose that engages the shoulder and which expands the shank when the insert is driven home.

For a full and more complete understanding of the invention, reference may be had to the following description and accompanying drawing, wherein.

Figure 1:
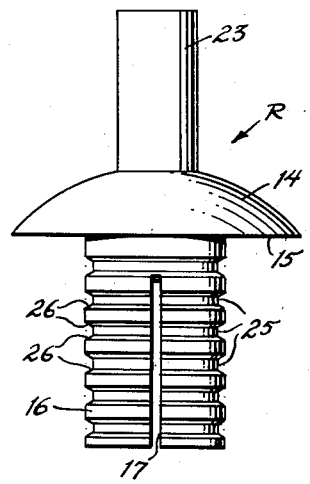
Figure 1 is a view in side elevation of a blind rivet designed in accordance with the precepts of this invention.
Figure 2:
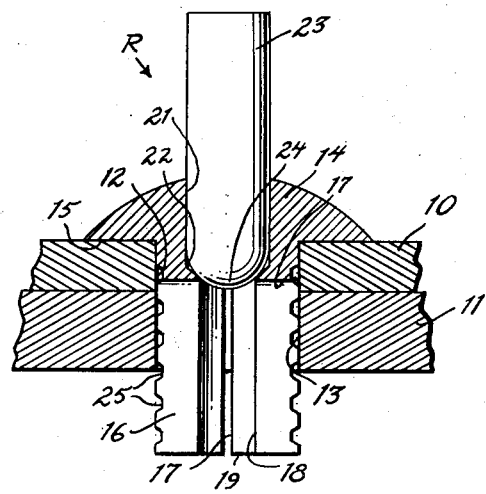
Figure 2 is a section through two plate elements that are to be joined by a blind rivet, with a blind rivet shown in position in aligned openings therein prior to expansion. In this view the rivet proper is shown in section and the insert in elevation.
Figure 3:
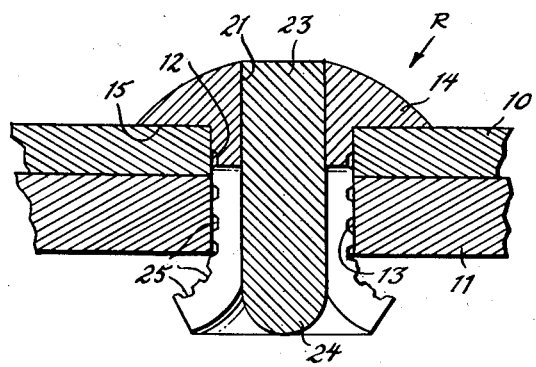
Figure 3 is a sectional view similar to Figure 2, with all parts shown in section after the insert has been driven home.

Figures 2 and 3 disclose two plate members 10 and 11 which are to be secured together by a blind rivet. The member 10 is formed with an opening 12 and the member 11 with an opening 13 of the same diameter as and in alignment with the opening 12. The blind rivet is referred to in its entirety by the reference character R and is shown in position in the openings 12 and 13 in Figure 2 prior to the clinching or driving home of the insert.

The blind rivet R comprises two parts. One of these is the rivet proper comprising a head 14 of dome shape having a flat annular ringlike surface 15 that engages the upper surface of the plate 10. Integrally joined to this head 14 and extending therefrom is a shank 16 of cylindrical cross section and which has a diameter substantially equal to that of the openings 12 and 13 so that it is snugly received therein. It will be noted that the lower end of the shank 16 is split by cross slits 17 which, in effect, divide the lower end of the shank into four sectors. Extending down into the shank is a longitudinal recess 18 which extends through the open end 19. This recess 18 is counterbored in the head, as represented at 21; and there is a conical shoulder 22 between counterbore 21 and recess 18.

Received in the counterbore 21 is an insert pin 23 that is of solid cylindrical formation having a rounded nose at 24 which normally engages the tapered shoulder 22.

The exterior surface of the shank 16 is formed with a plurality of annular grooves 25, with each groove presenting opposed edges at 26 which engage the surfaces defining the openings 12 and 13.

With one of these blind rivets in the position depicted in Figure 2, the mechanic strikes the end of the insert pin 23 with a hammer and drives it down into the rivet proper into the position depicted in Figure 3. After this action takes place, that portion of the shank 16 that is coextensive with the openings 12 and 13 is expanded; and the edges 26 of the grooves 25 caused to bite into the surfaces defining the openings 12 and 13. Moreover, the metal of the shank actually flows and partially closes the grooves 25 to give a secure binding effect by the expansion of the shank 16 in the openings 12 and 13. Moreover, the split free end of the shank 16 is expanded into the flared position depicted in Figure 3 and affords holding action supplemental to that caused by the expansion of the shank.

While a preferred specific embodiment of the invention is hereinbefore set forth, it is to be clearly understood that the invention is not to be limited to the exact constructions, mechanisms, and designs illustrated and described, because various modifications of these details may be provided in putting the invention into practice within the purview of the appended claims.

What is claimed is:

1. The combination including a plurality of plates having openings therethrough, and a blind rivet comprising a head, a shank having a substantially cylindrical outer surface of a diameter slightly less than said openings and of a length greater than the combined thickness of said plates extending integrally from said head for insertion through said openings, said shank being split by cross slits extending inward from the free end of said shank terminating short of and adjacent to said head by an amount less than the thickness of the topmost plate for location of the slit termini within the plates to be riveted, said shank being formed with a cylindrical recess of uniform diameter extending longitudinally inward from the free shank end and terminating approximate to the termini of said slits, there being a cylindrical counterbore in said head in alignment with and extending to the terminus of said recess, said counterbore being of greater diameter than said recess to define at the juncture thereof an internal shoulder facing generally outward through said counterbore, and a cylindrical insert pin fitting in said counterbore having an inner end adjacent to and formed to originally engage said shoulder and having an outer end protruding beyond said head, whereby an inward driving force on said pin deforms the shoulder and causes the metal to coldflow outwardly of the shank to expand the same into binding engagement with the surface of each of the plate openings and outwardly bend the portion of the shank which extends beyond the plates.

2. The combination recited in claim 1, said internal shoulder being located within the shank and substantially adjacent to said head, said shank having along its outer surface generally circumferentially extending grooves defining spaced ridges, whereby an inward force on said pin deforms the shoulder and causes the cold metal to flow outwardly of the shank into said grooves and into binding engagement with the surfaces of the plate openings to fill said openings, said ridges also moving transversely into binding engagement with the surfaces of the plate openings.

References Cited in the file of this patent

UNITED STATES PATENTS

| | | |
|---|---|---|
| 2,057,648 | Kiefner | Oct. 13, 1936 |
| 2,248,755 | Harthorn | July 8, 1941 |
| 2,355,439 | Horton | Aug. 8, 1944 |
| 2,389,479 | Austin | Nov. 20, 1945 |
| 2,569,826 | Packard | Oct. 2, 1951 |
| 2,597,444 | Brown | May 20, 1952 |
| 2,601,803 | Newman | July 1, 1952 |
| 2,640,618 | Hale | June 2, 1953 |
| 2,664,458 | Rapata | Dec. 29, 1953 |
| 2,668,468 | Flogaus | Feb. 9, 1954 |
| 2,751,809 | Barker | June 26, 1956 |

FOREIGN PATENTS

| | | |
|---|---|---|
| 708,884 | Great Britain | May 12, 1954 |